(12) United States Patent
Momonami et al.

(10) Patent No.: US 6,469,810 B1
(45) Date of Patent: Oct. 22, 2002

(54) PRINTING APPARATUS AND FACSIMILE APPARATUS

(75) Inventors: Shinichi Momonami, Nara; Ryuichi Fujiyama, Kashiba, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/264,767

(22) Filed: Mar. 9, 1999

(30) Foreign Application Priority Data

Mar. 9, 1998 (JP) .......................................... 10-056552

(51) Int. Cl.⁷ ................................................. H04N 1/04
(52) U.S. Cl. ........................................ 358/498; 399/382
(58) Field of Search ................................. 358/498, 496, 358/1.6, 1.9, 401; 399/382, 404; 270/58.31

(56) References Cited

U.S. PATENT DOCUMENTS 5,710,968 A * 1/1998 Clark et al. .................. 399/382
6,227,531 B1 * 5/2001 Guerrero et al. ........... 270/58.31

FOREIGN PATENT DOCUMENTS

| JP | 02023127 A | 1/1990 |
| JP | 03270560 A | 12/1991 |
| JP | 05270722 A | 10/1993 |
| JP | 410240079 A * | 9/1998 |

* cited by examiner

*Primary Examiner*—Cheukfan Lee
(74) *Attorney, Agent, or Firm*—Dike, Bronstein, Roberts & Cushman IP Group Edwards & Angell; David G. Conlin; David A. Tucker (57) ABSTRACT

In a facsimile apparatus equipped with a plurality of printing paper cassettes or trays for accommodating printing paper on which an output image is to be printed, the apparatus has designation means for designating one of the plurality of printing paper cassettes or trays as a special cassette or tray for accommodating separating paper in accordance with user's operation, and the special cassette or tray is controlled so that the paper accommodated in the special cassette or tray is not used to print the output image.

5 Claims, 7 Drawing Sheets

| FIG. 6A |
|---|
| FIG. 6B |

FIG. 6A ( SETTING OF SEPARATING PAPER )
↓
S1 DESIGNATE CASSETTE (TRAY) FOR SEPARATING PAPER VIA OPERATION PANEL
↓
S2 ASSIGN DESIGNATED CASSETTE (TRAY) TO SPECIAL CASSETTE (TRAY) DEDICATED TO SEPARATING PAPER
↓
S3 DETECT PAPER TYPE OF EACH CASSETTE (TRAY) USING PAPER DISCRIMINATOR OF APPARATUS
↓
S4 ANY DIFFERENT-SIZED PAPER?
— YES → S5 ASSIGN CASSETTE (TRAY) ACCOMMODATING DIFFERENT-SIZED PAPER TO SPECIAL CASSETTE (TRAY) DEDICATED TO SEPARATING PAPER
— NO → S6 ASSIGN PREDETERMINED CASSETTE (TRAY) TO SPECIAL CASSETTE (TRAY) DEDICATED TO SEPARATING PAPER
↓
S7 STORE SEPARATING PAPER CASSETTE (TRAY)
↓
( END )

PRINTING APPARATUS AND FACSIMILE APPARATUS

BACKGROUND OF THE INVENTION

1. Field of the Invention

The present invention relates to printing and facsimile apparatuses provided with a plurality of cassettes or trays for printing paper.

2. Description of the Related Art

There has been disclosed in Japanese Unexamined Patent Publication JP-A 3-270560 (1991) a prior art apparatus in which in connection with output of reception images, when printout on the basis of image signals received in a certain communication is shifted to printout on the basis of image signals received in the following communication, means for supplying paper is changed over in order to discriminate between the two receptions of image signals. For this purpose may be employed the following methods.

A first paper supplying section and a second paper supplying section each accommodate different types of printing paper which types are distinguished from each other. That is, after completion of recording of images received in the certain communication, when recording of images received in the following communication starts, or when printing of a first page in the following communication starts, the paper supplying section is switched so as to record the first page of the following communication on printing paper which is distinguishable from the printing paper which has been used for the certain communication. Thus, a separation between received images in the certain communication and the following communication is indicated.

In such a case, the separation is clarified when a change of printing paper is executed between a first page and the following pages of each communication, or between the respective communications. Distinction between types of printing paper is made on the basis of color, size, thickness or the like thereof.

In the prior art, the separation is clarified by changing the type, in other word, the feature of printing paper between the first page and the following pages. With regard to changing the feature of printing paper, if paper size is varied, document filing which will be carried out later is complicated, whereas, if paper color is varied, costs of printing paper increase though the filing problem is eliminated.

It is an object of the invention to solve the above-mentioned problems and to clarify a separation between printed documents, and in printing apparatus and communication apparatus such as facsimile apparatus or the like equipped with a printer section, having a plurality of printing paper cassettes or trays, the invention is intended to improve user-operability of an operation of inserting separating paper between plural documents outputted from the printing apparatus or the printer section so as to facilitate sorting of the plural documents such as printed documents of images sent from plural transmission parties, copies, and lists.

In a first aspect of the invention there is provided a printing apparatus comprising:

a plurality of printing paper cassettes or trays for accommodating printing paper on which an output image is to be printed, the printing apparatus further comprising:

designating means, operated by an operator, for designating one of the plurality of printing paper cassettes or trays as a special cassette or tray dedicated to accommodating separating paper, wherein the special cassette or tray is controlled so that the separating paper is not used as printing paper for printing the output image.

According to the invention, in connection with the control of inserting the paper having a different feature from that of the paper for printing, one of the plurality of printing paper cassettes or trays is fixedly used as the special cassette or tray dedicated to the separating paper, in other words, the one printing paper cassette or tray is prohibited to be used for supplying usual printing paper. Accordingly, even when the special cassette or tray accommodates colored paper, the colored paper is used exclusively for separating paper, so that wasteful use of the colored paper is avoided. Furthermore, since no image is printed on the colored paper, the colored paper may be reused, resulting in cost reduction.

In a second aspect of the invention, there is provided a printing apparatus comprising:

a plurality of printing paper cassettes or trays for accommodating printing paper on which an output image is to be printed, each printing paper cassette or tray for accommodating printing paper different in length and/or width, the printing apparatus further comprising:

selecting means for automatically selecting a cassette or tray accommodating printing paper different in length and/or width from printing paper having been used for printing the output image, wherein the selected cassette or tray is controlled so that the paper accommodated therein is discharged as separating paper.

According to the second aspect of the invention, when the apparatus is provided with means for discriminating a feature of paper, the control may be executed to fixedly use a cassette or tray which accommodates paper having a different feature, as the cassette or tray for supplying the separating paper.

In a third aspect of the invention, there is provided a facsimile apparatus comprising:

a plurality of printing paper cassettes and trays for accommodating printing paper on which an output image is to be printed, the facsimile apparatus further comprising:

designating means operated by an operator, for designating one of the plurality of printing paper cassettes or trays as a special cassette or tray for accommodating separating paper, wherein the special cassette or tray is controlled so that after completion of reception of data, communication information is printed on the separating paper therein and the separating. paper is not used as printing paper for printing the output image.

Many of facsimile apparatuses have a function of reporting a communication result. According to the third aspect of the invention, such a communication result may be printed on the separating paper accommodated in the special cassette or tray designated by the above-mentioned means. Thus the separating paper is also used for printing the communication result report, with the result of reducing paper costs.

In a fourth aspect of the invention, there is provided a facsimile apparatus comprising:

a plurality of printing paper cassettes or trays for accommodating printing paper on which an output image is to be printed, each printing paper cassette or tray for accommodating printing paper different in length and/or width, the facsimile apparatus further comprising:

selecting means for automatically selecting a cassette or tray accommodating printing paper different in length and/or width from printing paper having been used for printing the output image, wherein the selected cassette or tray is controlled so that after completion of reception of data, communication information is printed on the printing paper therein and the communication-information-printed printing paper is discharged as separating paper.

According to the fourth aspect of the invention, the same as in the third aspect, since the communication-information-printed printing paper serves also as separating paper, reduction of paper costs is achieved.

In the invention it is preferable that the cassette or tray automatically selected by the selecting means accommodates longer and/or wider printing paper than any other printing paper for printing output image, and the communication information is printed at a portion of the separating paper which portion is extended off one end of any other printing paper, when the one end of any other printing paper is trued up with one end of the separating papering paper.

According to the invention, in particular, when the separating paper is longer than any other printing paper in the discharge direction thereof, the difference portion (a portion extended off one end of any other printing paper) generated by truing up the rear ends of the separating paper and printing paper is used to record the information of communication result, with the result that contents of the communication, as well as the separating paper can be readily taken out by truing up the rear ends.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENT

Now referring to the drawings, preferred embodiments of the invention are described below.

Figure 1:
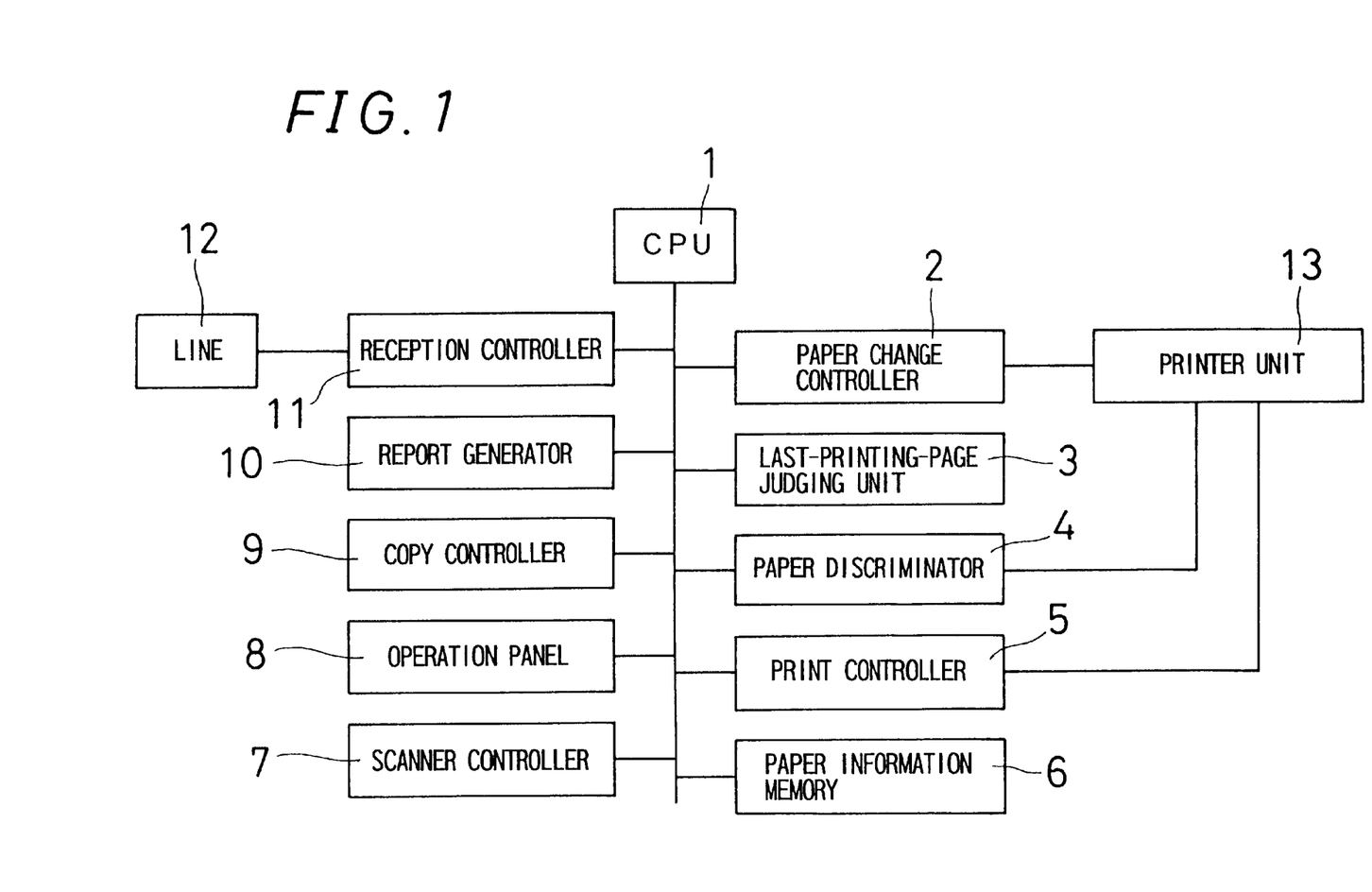
FIG. 1 is a block diagram showing a configuration of a facsimile apparatus according to the invention.
Figures 6, 6A:
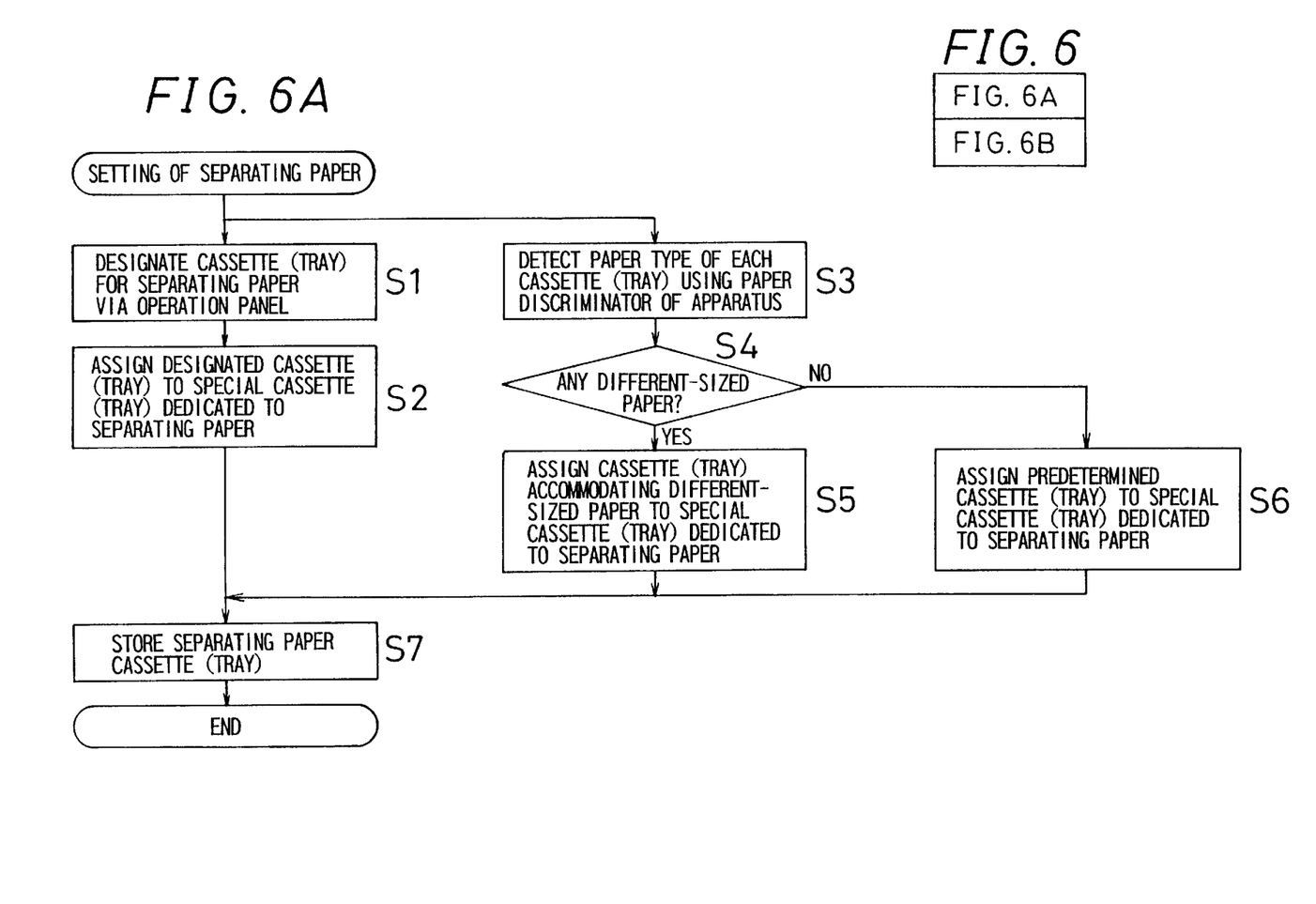
FIGS. 6A and 6B are flowcharts showing the operation of the invention.
Figure 6B:
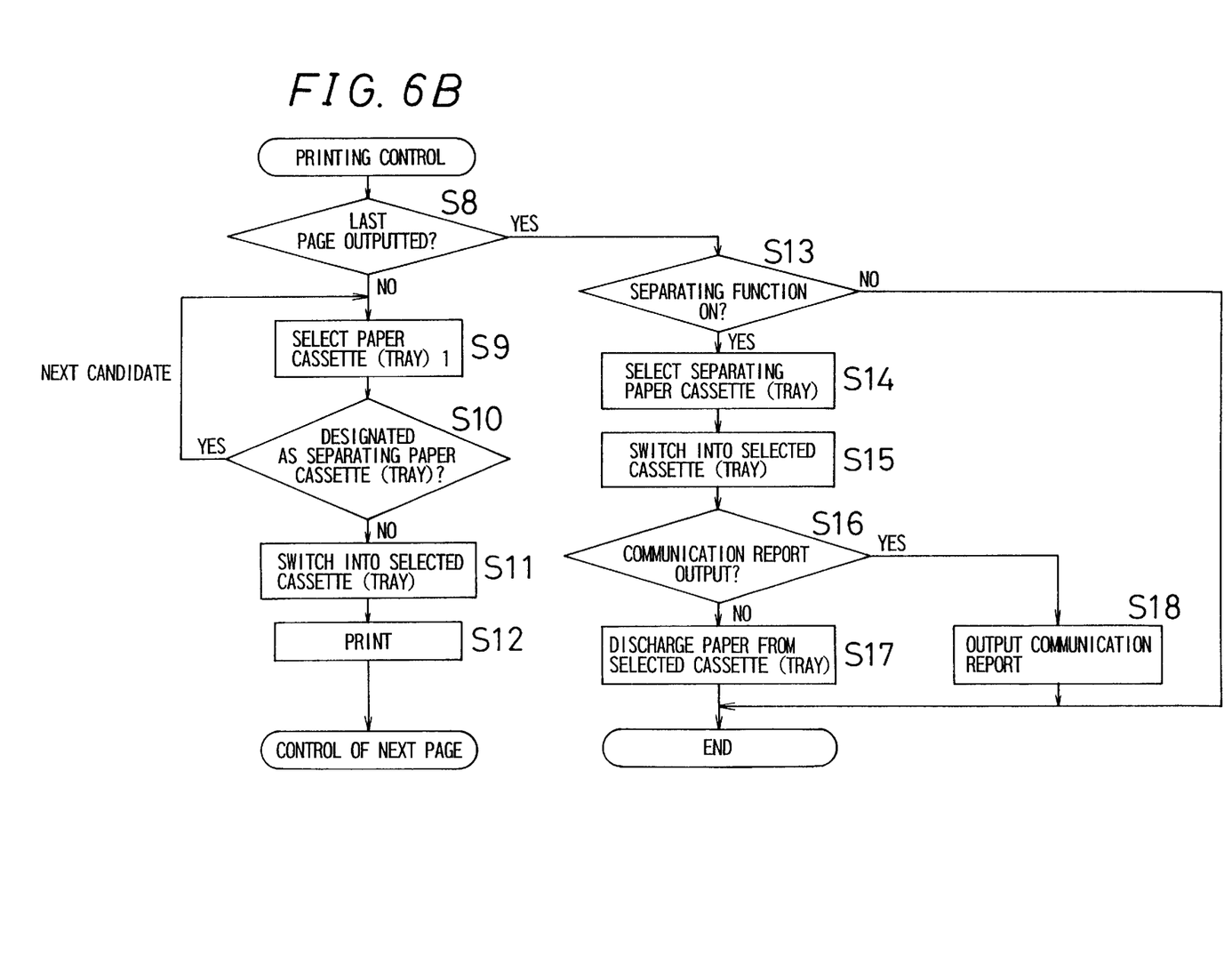

FIG. 1 is a block diagram of a facsimile apparatus which is one example of the invention, and FIGS. 6A and 6B is a processing flowchart of the same. In these drawings, a CPU 1 manages all the controls.

First, when insertion of separating paper is designated by an operator from an operation panel 8 (S1), information concerning a cassette or tray for supplying the separating paper is stored in a paper information memory 6 based on the user-designated information (S7). In this case, the information as to the paper may be designated by the operator, or may be information which is determined based on paper information discriminated by a paper discriminator 4 of the apparatus (S1 to S6).

(1) Next, the CPU 1 controls a reception controller 11 in response to incoming information from a line 12, and reception images are sequentially outputted by a printer unit 13 via a print controller 5. A last-printing-page judging unit 3 judges whether printout of the last page of the reception images has completed on the basis of information from the print controller 5 (S8). When it is judged as being completed, the CPU 1 controls a paper switching controller 2.

Figure 2:
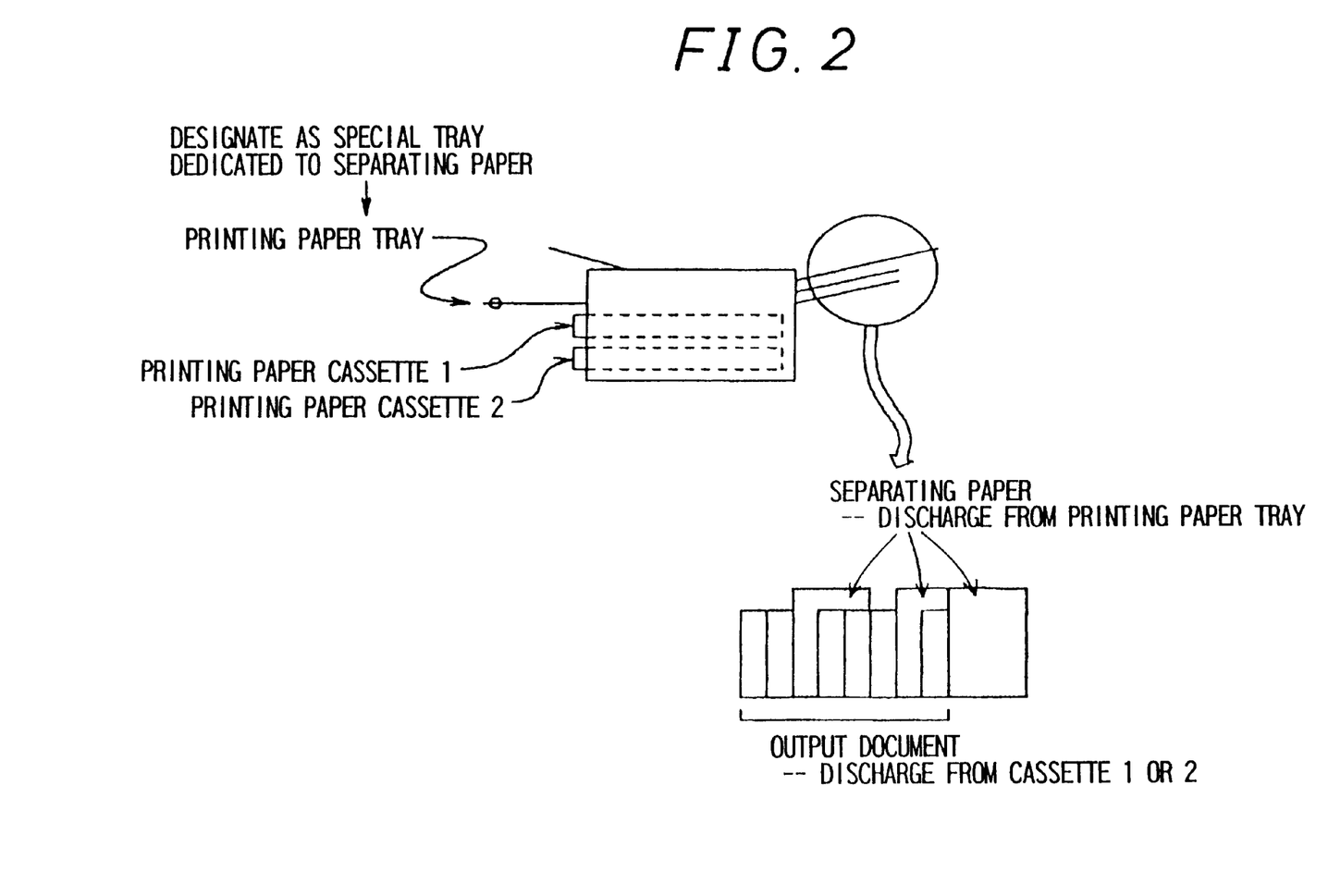
FIG. 2 shows a first example of an operation of the facsimile apparatus of the invention.
Figure 3:
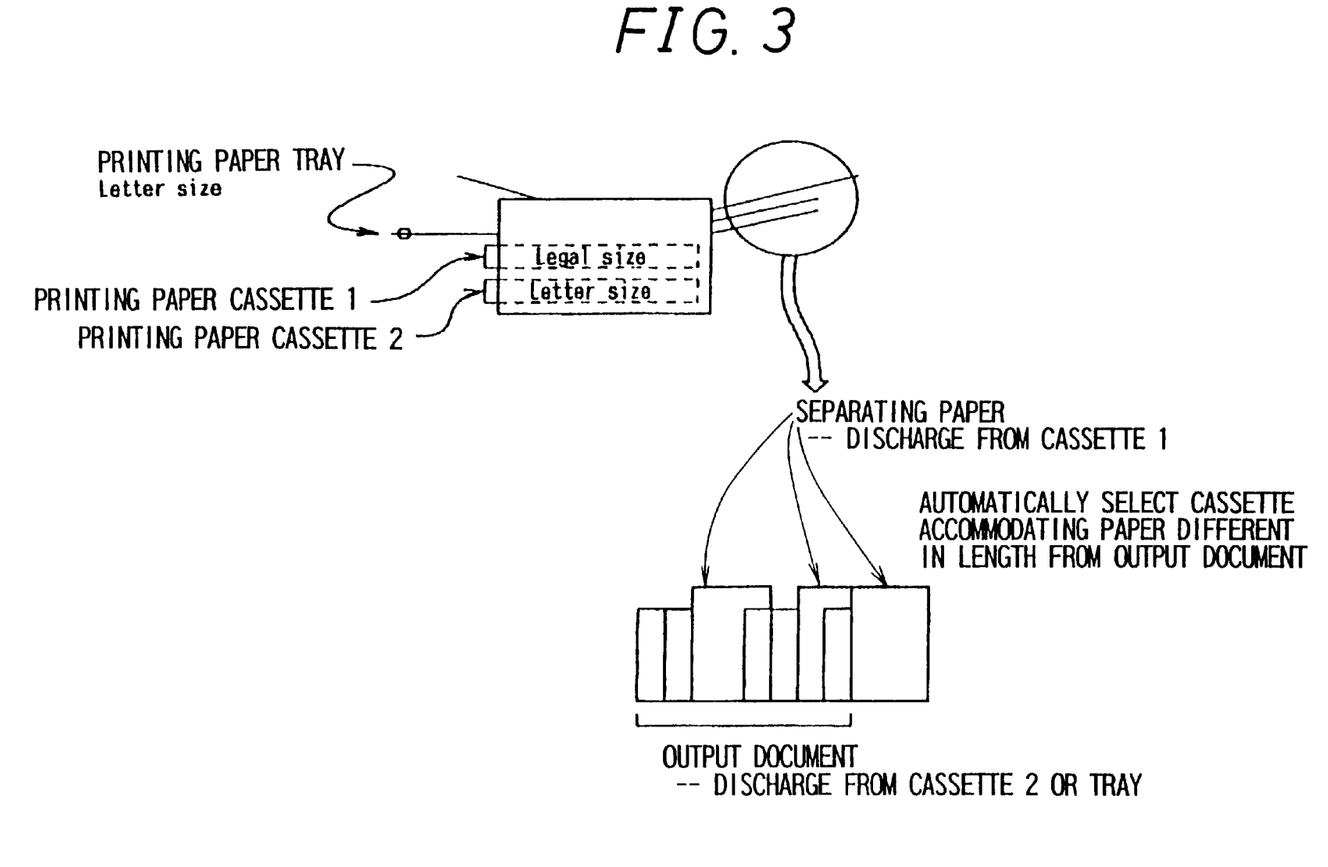
FIG. 3 shows a second example of the operation of the facsimile apparatus of the invention.

The paper switching controller 2 reads the above-determined separating paper information from the paper information memory 6 (S14), conducts switching of cassette or tray to a predetermined one (S15), and thereafter sends out a separating paper discharge signal to the print controller 5, which drives the printer unit 13 for causing it to output the separating paper (S17). (See FIGS. 2 and 3)

(2) In the case of outputting a communication result report as to reception, when the reception controller 11 detects reception of the last page, a report generator 10 judges information of communication result to generate report data in a predetermined form. At the same time, the paper switching controller 2 reads out the above-determined separating paper information from the paper information memory 6 (S14), conducts switching of cassette or tray to a predetermined one (S15), and thereafter outputs the report output signal to the print controller 5.

Figure 4:
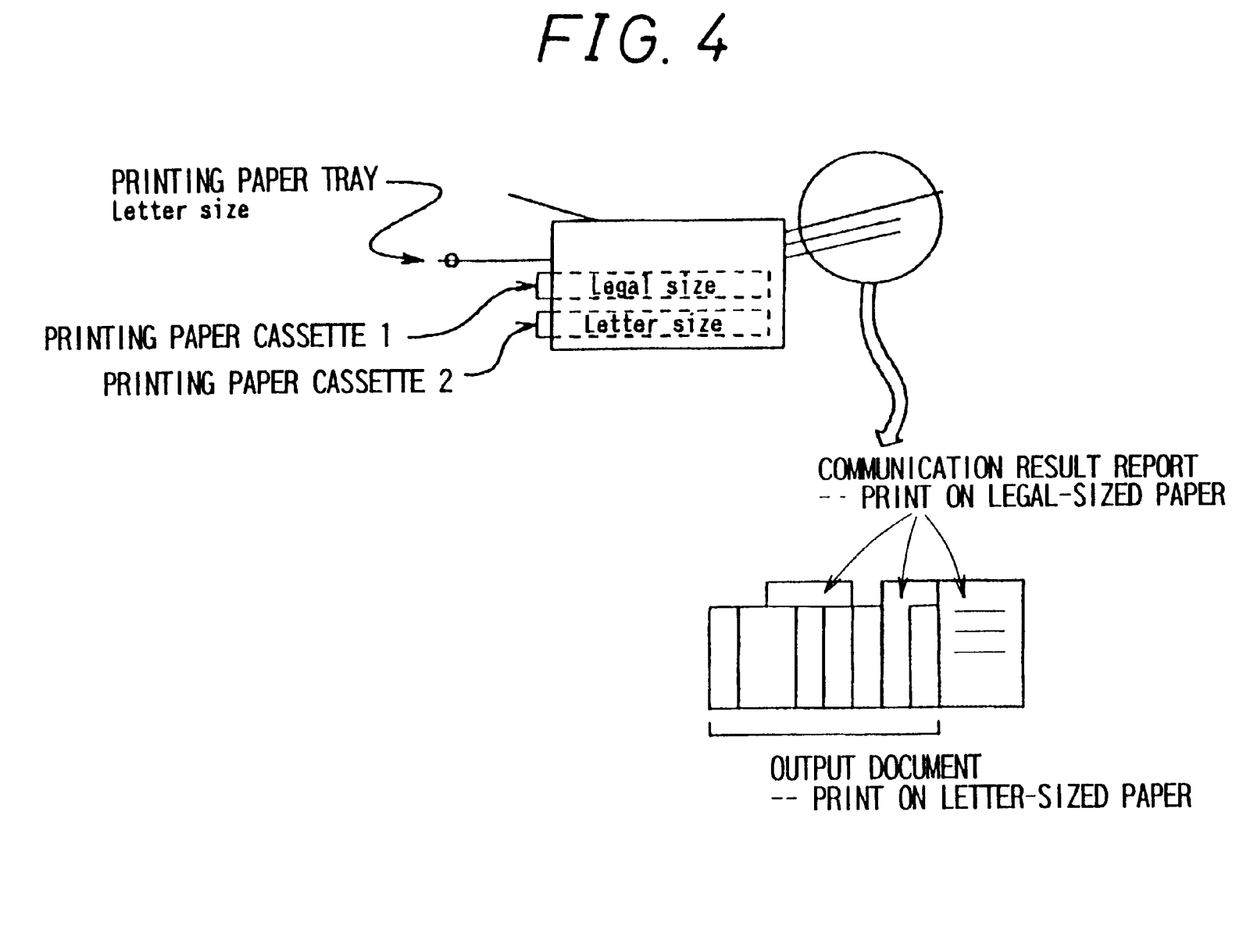
FIG. 4 shows a third example of the operation of the facsimile apparatus of the invention.

In response to this report output signal, the print controller 5 outputs the report data generated by the report generator 10 to the printer unit 13, which conducts printing of the report (S18). Since this report is printed on the paper accommodated in the cassette or tray which is designated as the separating paper, this report paper also serves as the separating paper. (See FIG. 4)

Figure 5:
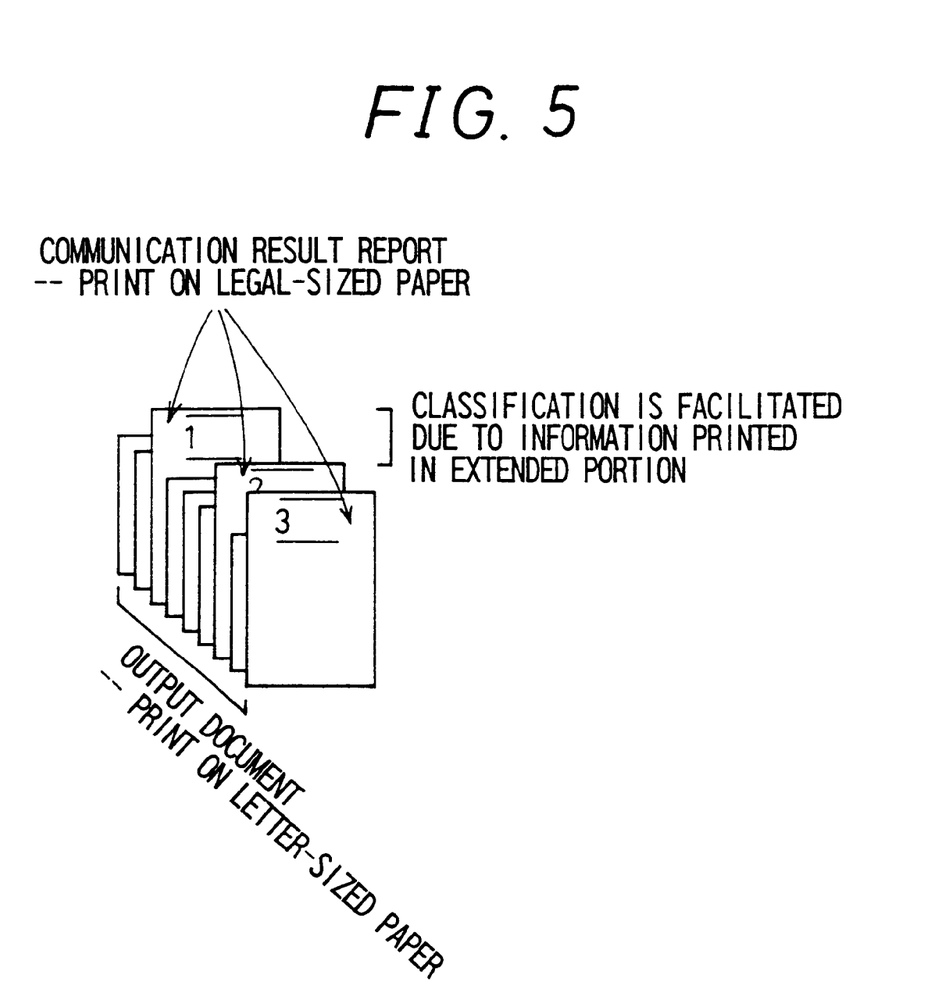
FIG. 5 shows a fourth example of the operation of the facsimile apparatus of the invention.

(3) In generating a report, the report generator 10 reads out the separating paper information from the paper information memory 6, determines a difference in length between the paper used for printing reception images and the separating paper, and generates report data having a length of the difference from end of the printing paper. As a result, the reception information and the reception images can be more readily discriminated.

(4) Though the above examples are illustrated in connection with reception, facsimile apparatuses recently used may have multiple printout functions as a copying machine, printer and the like. In such facsimile apparatuses, all the images outputted by such multiple functions accumulate altogether in the result, so that sufficient effects can not be obtained only by separating the reception images.

According to the present invention, however, separating paper can be inserted in the similar manner also in the case of copying operation. When the operator instructs for copying operation via the operation panel 8, the CPU 1 drives a copy controller 9. The copy controller 9 controls a scanner controller 7 and the print controller 5 for causing an image scanned by a scanner to be output to the printer unit 13. Also in this case, the CPU 1 controls the paper switching controller 2 when the last-printing-page judging unit 3 judges completion of printout of the last page.

Also after completion of copying operation, insertion or output of separating paper can be effected in the similar manner as described in (1). Also in the case of operation as a printer, insertion or output of separating paper can be effected in the similar manner. Thus the control described in (1) to (4) enables insertion of separating paper for all of the images that the facsimile apparatus outputs to the printer unit.

(5) In the case where a normal printing operation is executed under the controls of (1) to (4), the print controller 5 reads out the paper information from the print information memory 6 when selecting a cassette or tray accommodating appropriate paper. At this time, whether the paper to be selected is designated as separating paper (S10) is judged, and when it is judged that the paper is designated as separating paper, a judgement is made to prohibit use of that paper for printing operation. In this way, the separating paper is separated from the printing paper used for printing the output images.

Furthermore, many of facsimile apparatuses recently used have multiple printout functions conducted by copying facility, communication facility, and printer facility. However, by employing above-mentioned insertion of separating paper to all these printout functions, separations can be clarified for all the output documents.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the rage of equivalency of the claims are therefore intended to be embraced therein.

What is claimed is:

1. A printing apparatus comprising:

a plurality of paper cassettes or trays for accommodating printing paper on which an output image is to be printed, the printing apparatus further comprising:

designating means, operated by an operator, for designating one of the plurality of printing paper cassettes or trays as a special cassette or tray dedicated to accommodating separating paper, wherein the special cassette or tray is controlled so that the separating paper accommodated therein is not used as printing paper for printing an output image but is selectively discharged as a separator to separate the printing paper on which each output image or a preselected group of output images is printed.

2. A printing apparatus comprising:

a plurality of printing paper cassettes or trays for accommodating printing paper on which an output image is to be printed, each printing paper cassette or tray for accommodating printing paper being adapted to accommodate printing paper of a different length and/or width, the printing apparatus further comprising:

selecting means for automatically selecting upon the completion of the printing of each output image or group of output images a cassette or tray accommodating printing paper having a different length and/or width from the printing paper used for printing the output image or a preselected group of output images as a special cassette or tray, wherein the special cassette or tray is controlled so that the paper accommodated therein is discharged as a separator between the printing paper on which each output image or group of preselected output images is printed but not otherwise.

3. A facsimile apparatus comprising:

a plurality of printing paper cassettes and trays for accommodating printing paper on which an output image is to be printed, the facsimile apparatus further comprising:

designating means operated by an operator, for designating one of the plurality of printing paper cassettes or trays as a special cassette or tray for accommodating separating paper, wherein the special cassette or tray is controlled so that after completion of reception of data, communication information is printed on the separating paper therein and the separating paper is not used as printing paper for printing the output image.

4. A facsimile apparatus comprising:

a plurality of printing paper cassettes or trays for accommodating printing paper on which an output image is to be printed, each printing paper cassette or tray for accommodating printing paper different in length and/or width, the facsimile apparatus further comprising:

selecting means for automatically selecting a cassette or tray accommodating printing paper different in length and/or width from printing paper having been used for printing the output image, wherein the selected cassette or tray is controlled so that after completion of reception of data, communication information is printed on the printing paper therein and the communication-information-printed printing paper is discharged as separating paper.

5. The facsimile apparatus of claim 4, wherein the cassette or tray automatically selected by the selecting means accommodates longer and/or wider printing paper than any other printing paper, and the communication information is printed at a portion of the separating paper, the portion being extended off one end of any other printing paper, when the one end of any other printing paper is trued up with one end of the separating papering paper.

* * * * *